United States Patent
Maruyama

(10) Patent No.: US 11,394,843 B2
(45) Date of Patent: Jul. 19, 2022

(54) MULTIFUNCTION PERIPHERAL CAPABLE OF EXECUTING IMAGE PROCESSINGS IN PARALLEL, METHOD OF CONTROLLING SAME, AND STORAGE MEDIUM

(71) Applicant: CANON KABUSHIKI KAISHA, Tokyo (JP)

(72) Inventor: Naoki Maruyama, Ibaraki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/185,172

(22) Filed: Feb. 25, 2021

(65) Prior Publication Data
US 2021/0281687 A1     Sep. 9, 2021

(30) Foreign Application Priority Data

Mar. 6, 2020   (JP) .............................. JP2020-039054

(51) Int. Cl.
*H04N 1/00*     (2006.01)
(52) U.S. Cl.
CPC ....... *H04N 1/0083* (2013.01); *H04N 1/00912* (2013.01); *H04N 2201/0094* (2013.01)
(58) Field of Classification Search
CPC .......... H04N 1/00572; H04N 1/00822; H04N 1/0446; H04N 1/00795; H04N 1/00689; H04N 1/00708; H04N 1/00734; H04N 1/00801; H04N 1/00814; H04N 1/00827; H04N 1/00912; H04N 1/1017; H04N 1/193; H04N 2201/0081; G06F 3/1212; G06F 3/1215; G06F 3/122; G06F 3/124; G06F 3/1247; G06F 3/1285; G06K 15/00; G06K 2215/0005; G06K 2215/0042; G06K 2215/0082
USPC ....................................................... 358/1.15
See application file for complete search history.

(56) References Cited

U.S. PATENT DOCUMENTS

| | | | |
|---|---|---|---|
| 9,432,541 B2 * | 8/2016 | Ishida | H04N 1/0083 |
| 10,819,878 B2 * | 10/2020 | Hirao | H04N 1/32683 |
| 11,115,552 B2 * | 9/2021 | Sato | H04N 1/00572 |
| 2014/0168700 A1 * | 6/2014 | Araya | G06F 3/1279 358/1.15 |
| 2018/0314668 A1 * | 11/2018 | Kawamoto | G06F 3/1293 |
| 2020/0137261 A1 * | 4/2020 | Hirao | H04N 1/047 |

(Continued)

FOREIGN PATENT DOCUMENTS

JP         2013153521 A       8/2013

*Primary Examiner* — Negussie Worku
(74) *Attorney, Agent, or Firm* — Rossi, Kimms & McDowell LLP

(57) ABSTRACT

In a multifunction peripheral, image data generated by a scanner section is transferred to an image processor via a data bus. If it is determined that an image processing and another image processing are not executed in parallel, the transfer rate of image data is set to a first transfer rate, whereas if it is determined that the image processing and the other image processing are executed in parallel, one of a plurality of different transfer rates lower than the first transfer rate is selected based on a result of determination of whether or not settings associated with the image processing are predetermined settings and a result of determination of whether or not settings associated with the other image processing are other predetermined settings, and the transfer rate of image data is set to the selected one.

13 Claims, 16 Drawing Sheets

(56) References Cited

U.S. PATENT DOCUMENTS

2021/0044714 A1\* 2/2021 Shinohara ................ H04N 1/17
2021/0084190 A1\* 3/2021 Sato ................... H04N 1/00822
2021/0120133 A1\* 4/2021 Shinohara .......... H04N 1/00236
2021/0195047 A1\* 6/2021 Maruyama ......... H04N 1/00931
2021/0385349 A1\* 12/2021 Kasuya ................... H04N 1/17

\* cited by examiner

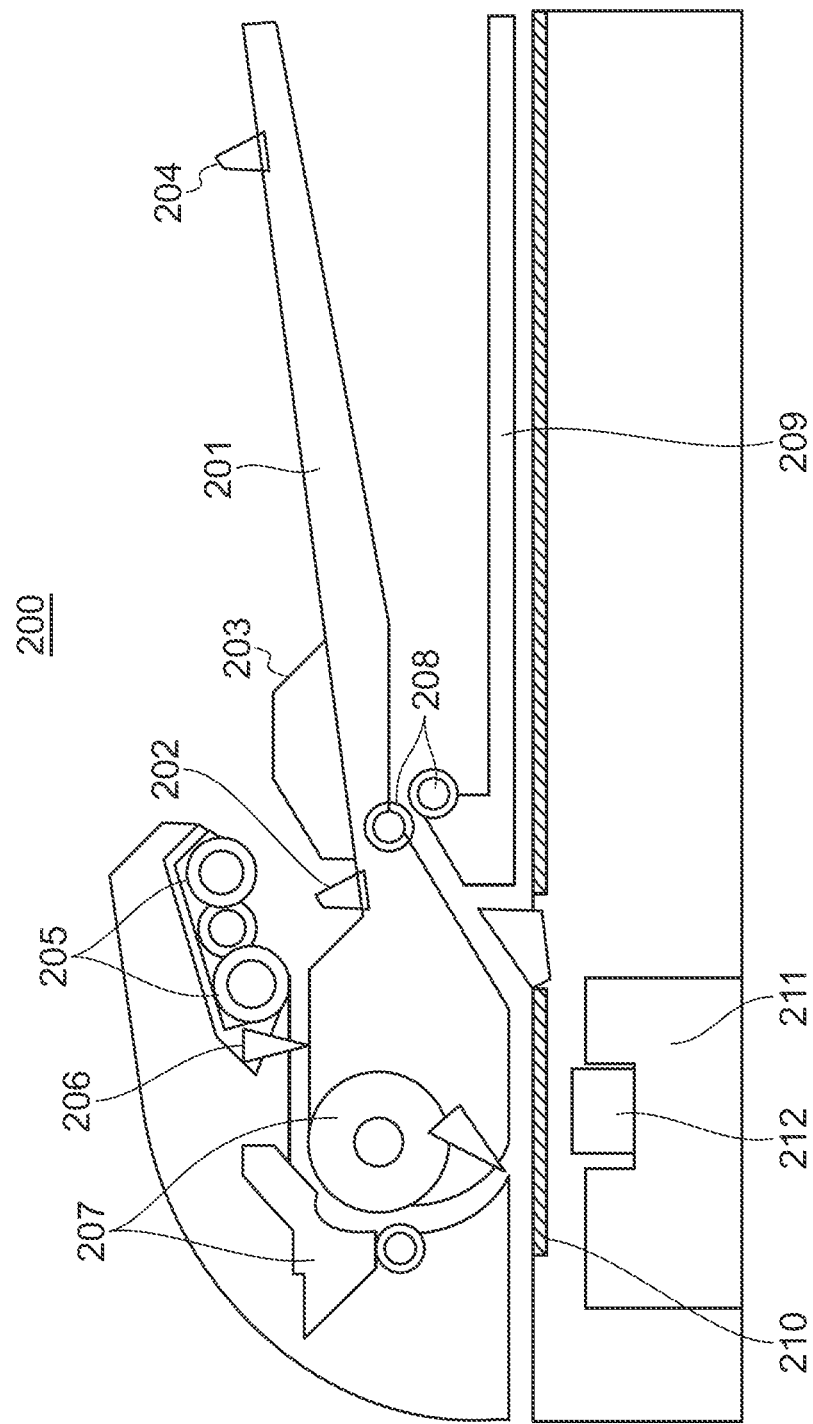

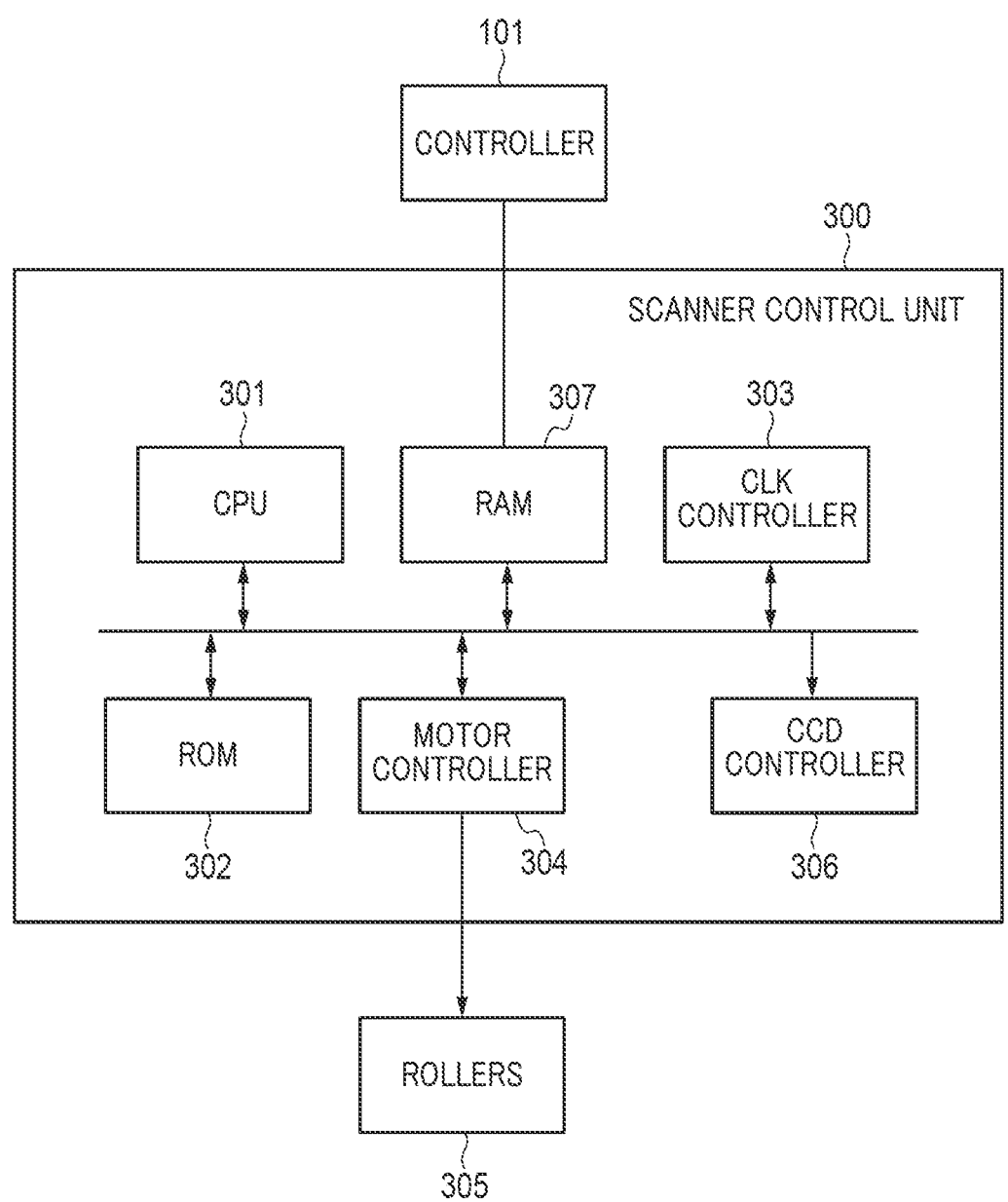

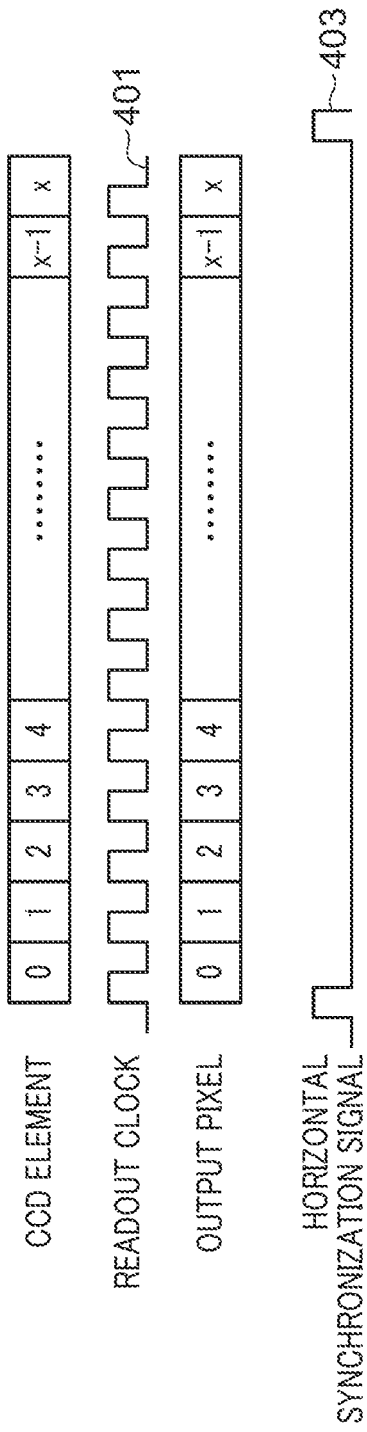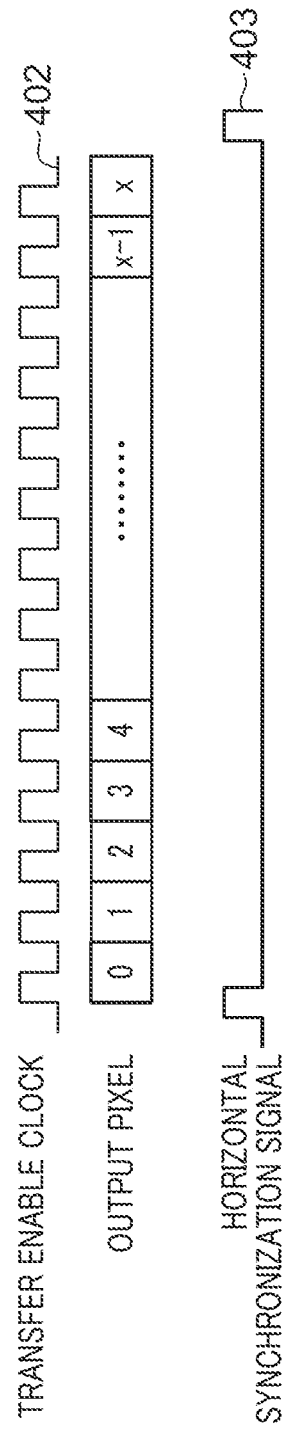

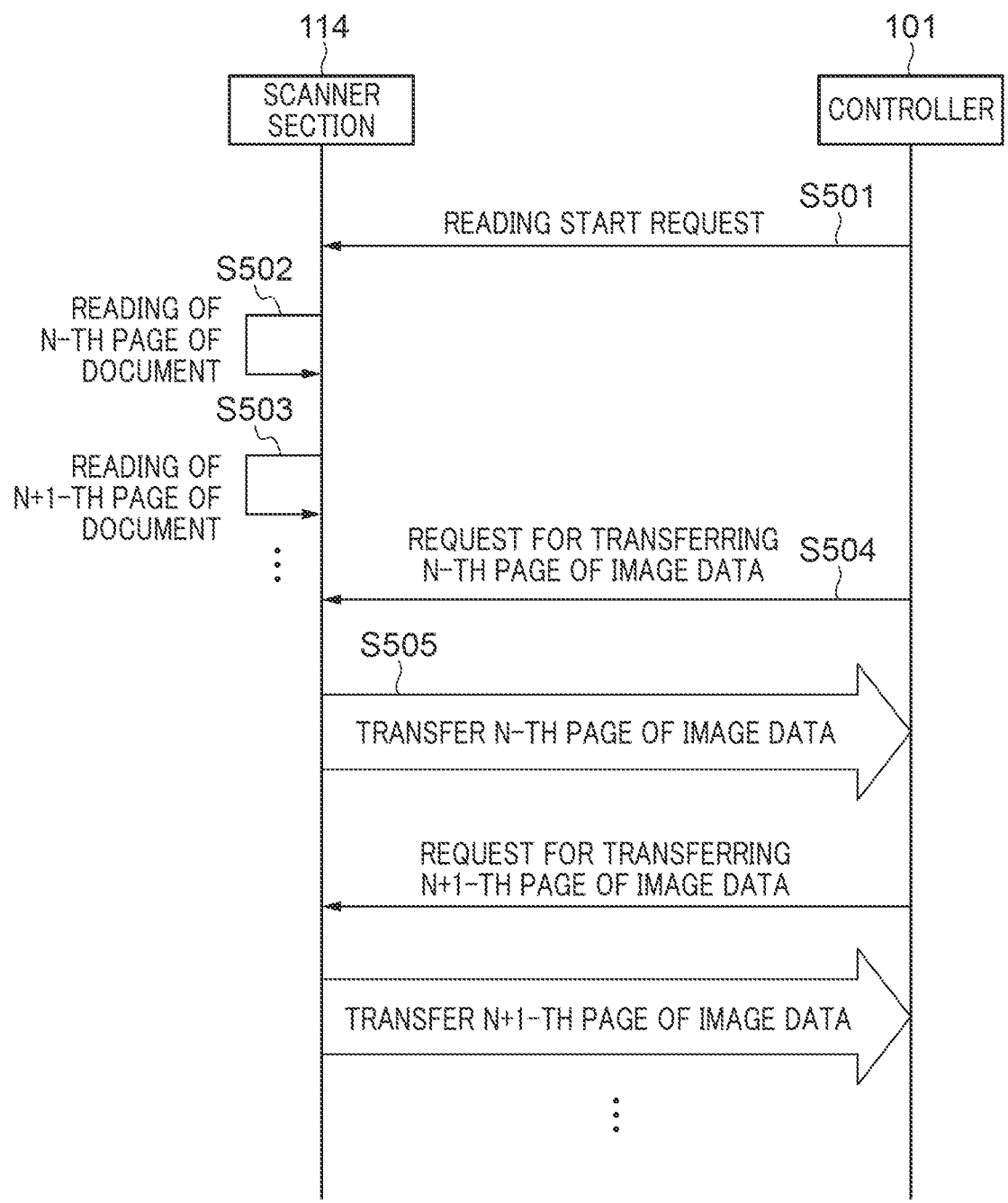

*FIG. 10*

| SCAN READING COLOR | SCAN READING SHEET SIDE | SCAN RESOLUTION | NECESSITY OF SWITCHING OF CLOCK |
|---|---|---|---|
| CL | BOTH SIDES | 300 × 300 | NECESSARY |
| | | OTHER | UNNECESSARY |
| | SINGLE SIDE | – | |
| BW | – | – | |

*FIG. 12*

| PRINT COLOR | PRINT SIZE | PRINT SPEED | PRINT RESOLUTION | TRANSFER CLOCK MODE |
|---|---|---|---|---|
| CL | NOT SMALLER THAN A3 | CONSTANT SPEED | 1200dpi | LOW RATE |
| | | | 600dpi | MEDIUM RATE |
| | | HALF SPEED | 1200dpi | LOW RATE |
| | | | 600dpi | MEDIUM RATE |
| | SMALLER THAN A3 | CONSTANT SPEED | 1200dpi | LOW RATE |
| | | | 600dpi | MEDIUM RATE |
| | | HALF SPEED | 1200dpi | MEDIUM RATE |
| | | | 600dpi | MEDIUM RATE |
| BW | — | CONSTANT SPEED | 1200dpi | LOW RATE |
| | | | 600dpi | MEDIUM RATE |
| | | HALF SPEED | 1200dpi | MEDIUM RATE |
| | | | 600dpi | MEDIUM RATE |

*FIG. 14*

| PROCESSING COLOR | RIP RESOLUTION | TRANSFER CLOCK MODE |
|---|---|---|
| CL | 1200dpi | LOW RATE |
| CL | 600dpi | MEDIUM RATE |
| BW | 1200dpi | MEDIUM RATE |
| BW | 600dpi | MEDIUM RATE |

FIG. 16

| PROCESSING COLOR | PROCESSING RESOLUTION | TRANSFER CLOCK MODE |
|---|---|---|
| CL | 1200dpi | LOW RATE |
| | 600dpi | MEDIUM RATE |
| BW | 1200dpi | MEDIUM RATE |
| | 600dpi | MEDIUM RATE |

MULTIFUNCTION PERIPHERAL CAPABLE OF EXECUTING IMAGE PROCESSINGS IN PARALLEL, METHOD OF CONTROLLING SAME, AND STORAGE MEDIUM

BACKGROUND OF THE INVENTION

Field of the Invention

The present invention relates to a multifunction peripheral that is capable of executing image processings in parallel, a method of controlling the same, and a storage medium.

Description of the Related Art

There is known a multifunction peripheral (mFP) equipped with a plurality of functions, such as a scan function and a print function. In the MFP, a scanner section reads a sheet of a document at a reading speed set by a user, and transfers image data of the read sheet of the document to an image processor in synchronism with an image transfer clock of a predetermined frequency (see e.g. Japanese Laid-Open Patent Publication (Kokai) No. 2013-153521). The image processor performs an image processing on the received image data, temporarily stores the processed image data in a main memory of the MFP, and further, acquires the processed image data from the main memory when another image processing is performed on the processed image data. In the MFP, the scanner section, the image processor, and the main memory perform data transfer via one image bus. In recent years, there has been developed an mFP that is capable of realizing high-speed reading, and in a case where a high-speed reading scan job is executed, the amount of data to be transferred via the image bus per unit time is increased, compared with a case where a normal-speed reading scan job is executed. Further, in the MFP, an image processing and the like on PDL data to be printed by a printer section is also executed by the image processor, and the printer section and the image processor perform data transfer via the above-mentioned image bus.

In the MFP, during execution of a scan job, execution of another job, e.g. a print job, is sometimes instructed, so that the scan job is executed in parallel with the print job. In this case, in the MFP, the scanner section, the printer section, the image processor, and the main memory perform data transfer via the image bus in parallel, so that the image bus is congested. Further, if high-speed reading is being performed in the scan job, the amount of data to be transferred via the image bus per unit time is huge and exceeds an upper limit value of the amount of data transferable via the image bus. If the amount of data to be transferred via the image bus exceeds the upper limit value of the transferable data amount, data transfer via the image bus cannot be executed and execution of the scan job and the print job is stopped. On the other hand, in a case where an image processing for a scan job is executed in parallel with another image processing, it is being considered to switch the transfer rate at which the scanner section transfers image data via the image bus for the image processing of the scan job to a transfer rate lower than a predetermined transfer rate. With this, when the image processing for the scan job is executed in parallel with the other image processing, the amount of data to be transferred via the image bus per unit time is controlled so as to prevent the amount of data to be transferred via the image bus from exceeding the upper limit value of the transferable data amount.

However, in the above-described control method, even if the image processing for the scan job and the other image processing have such contents to be processed that even when these processings are executed in parallel, the amount of data to be transferred via the image bus per unit time does not exceed the upper limit value of the transferable data amount, the above-described switching of the transfer rate is performed. As a result, the execution time of the image processing for the scan job is unnecessarily increased. That is, according to the conventional technique, it is impossible to execute another image processing in parallel with an image processing for a scan job without unnecessarily increasing the execution time of the image processing of the scan job.

SUMMARY OF THE INVENTION

The present invention provides a multifunction peripheral that is capable of executing an image processing in parallel with another image processing without unnecessarily increasing the execution time of the image processing, a method of controlling the same, and a storage medium.

In a first aspect of the present invention, there is provided a multifunction peripheral including a reading controller having a reading section that reads an image of a sheet of a document to generate image data, an image processor configured to execute image processing on image data, a transfer unit configured to transfer image data from the reading controller to the image processor via a data bus, and at least one processor or circuit configured to perform the operations of the following units: a first determination unit configured to determine whether or not the image processing and another predetermined image processing are executed in parallel, a second determination unit configured to determine whether or not settings associated with the image processing are predetermined settings, a third determination unit configured to determine whether or not settings associated with the other predetermined image processing are other predetermined settings, and a setting unit configured to, in a case where it is determined by the first determination unit that the image processing and the other predetermined image processing are not executed in parallel, set a transfer rate of image data to be transferred by the transfer unit to a first transfer rate, and, in a case where it is determined by the first determination unit that the image processing and the other predetermined image processing are executed in parallel, select one transfer rate out of a plurality of different transfer rates lower than the first transfer rate based on a result determined by the second determination unit and a result determined by the third determination unit, and set the transfer rate of image data to be transferred by the transfer unit to the selected transfer rate.

In a second aspect of the present invention, there is provided a method of controlling a multifunction peripheral including a reading controller having a reading section that reads an image of a sheet of a document to generate image data, an image processor configured to execute image processing on image data, and a transfer unit configured to transfer image data from the reading controller to the image processor via a data bus, the method comprising performing first determination for determining whether or not the image processing and another predetermined image processing are executed in parallel, performing second determination for determining whether or not settings associated with the image processing are predetermined settings, performing third determination for determining whether or not settings associated with the other predetermined image processing are other predetermined settings, and setting, in a case where it is determined by the first determination that the image processing and the other predetermined image processing are not executed in parallel, a transfer rate of image data to be transferred by the transfer unit to a first transfer rate, and, in a case where it is determined by the first determination that the image processing and the other predetermined image processing are executed in parallel, selecting one transfer rate out of a plurality of different transfer rates lower than the first transfer rate based on a result determined by the second determination and a result determined by the third determination and setting the transfer rate of image data to be transferred by the transfer unit to the selected transfer rate.

In a third aspect of the present invention, there is provided a non-transitory computer-readable storage medium storing a program for causing a computer to execute a method of controlling a multifunction peripheral including a reading controller having a reading section that reads an image of a sheet of a document to generate image data, an image processor configured to execute image processing on image data, and a transfer unit configured to transfer image data from the reading controller to the image processor via a data bus, wherein the method comprises performing first determination for determining whether or not the image processing and another predetermined image processing are executed in parallel, performing second determination for determining whether or not settings associated with the image processing are predetermined settings, performing third determination for determining whether or not settings associated with the other predetermined image processing are other predetermined settings, and setting, in a case where it is determined by the first determination that the image processing and the other predetermined image processing are not executed in parallel, a transfer rate of image data to be transferred by the transfer unit to a first transfer rate, and, in a case where it is determined by the first determination that the image processing and the other predetermined image processing are executed in parallel, selecting one transfer rate out of a plurality of different transfer rates lower than the first transfer rate based on a result determined by the second determination and a result determined by the third determination and setting the transfer rate of image data to be transferred by the transfer unit to the selected transfer rate.

According to the present invention, it is possible to execute an image processing in parallel with another image processing without unnecessarily increasing the execution time of the image processing.

Further features of the present invention will become apparent from the following description of exemplary embodiments (with reference to the attached drawings).

BRIEF DESCRIPTION OF THE DRAWINGS

FIG. 2 is a side view showing an internal structure of a DF section of a scanner section appearing in FIG. 1.

FIG. 3 is a schematic block diagram of a scanner control unit of the scanner section appearing in FIG. 1.

FIGS. 4A and 4B are diagrams useful in explaining clocks for controlling readout of an image, which is performed by a CIS appearing in FIG. 2.

FIG. 5 is a sequence diagram of an image reading operation executed by the MFP shown in FIG. 1.

FIG. 10 is a table showing conditions for determining whether or not to switch a clock.

FIG. 12 is a table showing transfer clock modes corresponding to settings associated with the print image processing.

FIG. 14 is a table showing transfer clock modes corresponding to settings associated with the RIP processing.

FIG. 16 is a table showing transfer clock modes corresponding to settings associated with the imaging image processing.

DESCRIPTION OF THE EMBODIMENTS

The present invention will now be described in detail below with reference to the accompanying drawings showing embodiments thereof.

Figure 1:
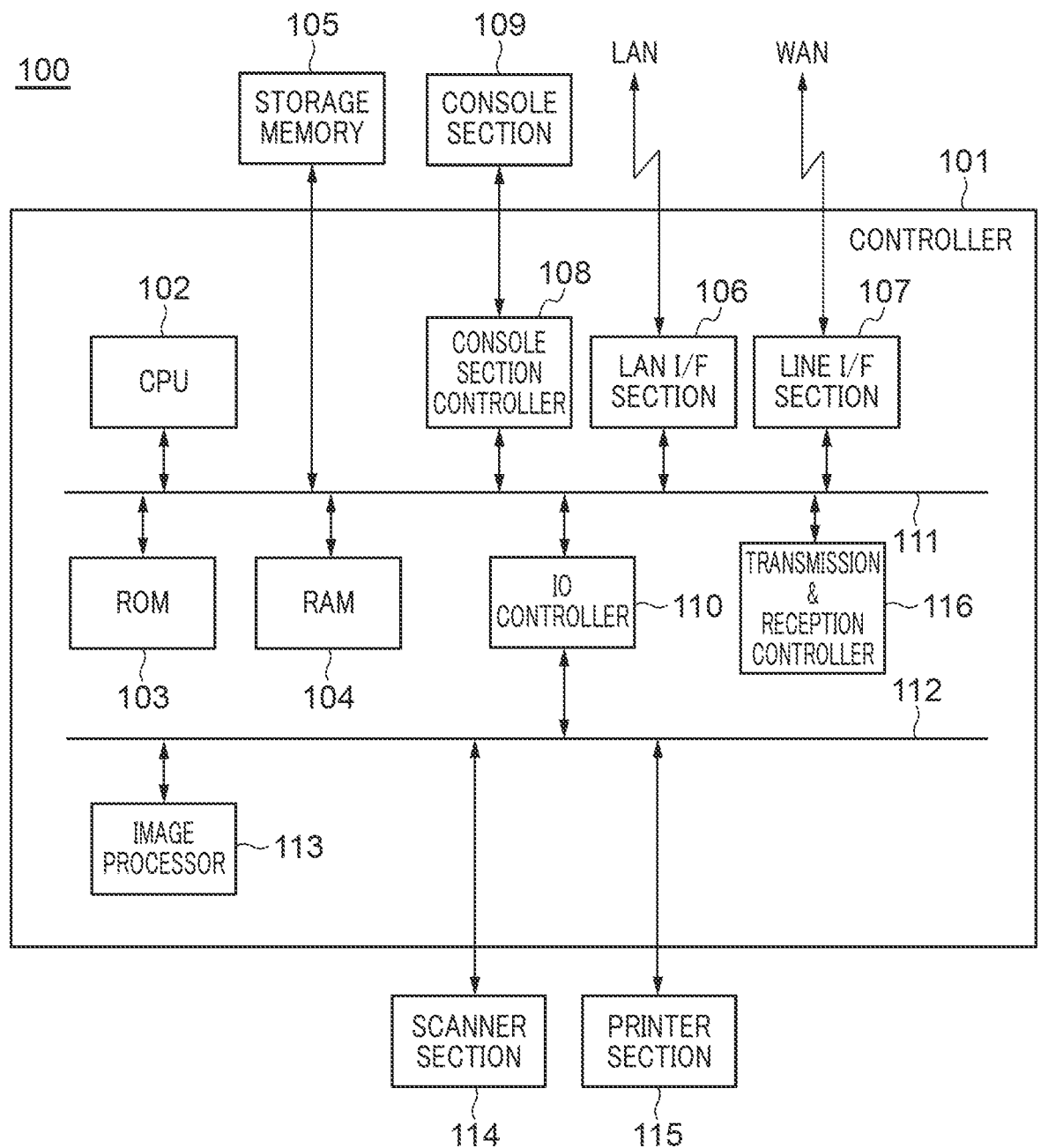
FIG. 1 is a schematic block diagram of a multifunction peripheral (MFP) according to an embodiment of the present invention.

FIG. 1 is a schematic block diagram of a multifunction peripheral (MFP) 100 according to an embodiment of the present invention.

Referring to FIG. 1, the MFP 100 includes a controller 101, a storage memory 105, a console section 109, a scanner section 114 (reading section), and a printer section 115. The controller 101 is connected to the storage memory 105, the console section 109, the scanner section 114, and the printer section 115. Further, the controller 101 includes a CPU 102, a ROM 103, a RAM 104, a LAN interface section 106, a line interface section 107, a console section controller 108, an TO controller 110, an image processor 113, and a transmission & reception controller 116. The CPU 102, the ROM 103, the RAM 104, the LAN interface section 106, the line interface section 107, the console section controller 108, the TO controller 110, and the transmission & reception controller 116 are interconnected via a system bus 111. The image processor 113 is connected to the TO controller 110 via an image bus 112 (data bus).

The controller 101 performs centralized control of the overall operation of the MFP 100. The CPU 102 causes software modules (not shown) of the MFP 100 to execute respective processing operations by executing programs stored in the ROM 103 or the storage memory 105. The ROM 103 stores a boot program of the system and the like. The RAM 104 is a system work memory area for the CPU 102 that executes the software modules (not shown) of the MFP 100. Further, the RAM 104 is an image memory for temporarily storing, when image data is processed, the image data. The storage memory 105 is implemented by an HDD (Hard Disk) or an SSD (Solid State Drive) and is used as an internal storage. The storage memory 105 stores, for example, system software modules for realizing the functions of the MFP 100 and image data to be transferred from the RAM 104.

The LAN interface section 106 is an interface for connecting the MFP 100 to a LAN. The LAN interface section 106 performs data communication with an external apparatus connected to the LAN. The line interface section 107 is an interface for connecting the MFP 100 to a WAN. The line interface section 107 performs data communication with an external apparatus connected to the WAN. The transmission & reception controller 116 controls transmission of image data read from the storage memory 105 to an external apparatus via the LAN interface section 106 or the line interface section 107. Further, the transmission & reception controller 116 controls storing of data received via the LAN interface section 106 or the line interface section 107 in the storage memory 105. The console section controller 108 is an interface between the controller 101 and the console section 109. For example, the console section controller 108 outputs VGA signals to the console section 109 to display an image corresponding to the VGA signals on the console section 109. Further, the console section controller 108 outputs information input to the console section 109 by a user to the CPU 102. The console section 109 is formed by a LCD touch panel and/or the like. The console section 109 interprets the VGA signals output from the console section controller 108 and displays an image corresponding to the VGA signals.

The 10 controller 110 is a bus bridge that connects between the system bus 111 and the image bus 112 and converts the data structure of the system bus 111. The image bus 112 is formed by a general-purpose bus, such as a PCI bus, an IEEE 1394 bus, and a PCIEx bus, and transfers image data at a high rate. To the image bus 112, not only the 10 controller 110 and the image processor 113, but also the scanner section 114 and the printer section 115 are connected. The image bus 112 performs synchronous-to-asynchronous or asynchronous-to-synchronous conversion of image data. The image processor 113 is implemented by a plurality of ASICs (Application Specific Integrated Circuits), as described hereinafter with reference to FIG. 7. Note that the ASIC is a general term of an integrated circuit made for a specific usage. The image processor 113 performs resolution conversion processing, compression processing, decompression processing, binary-multivalue conversion processing, and so forth, on image data. The scanner section 114 includes a DF (Document Feeder) section 200, appearing in FIG. 2, and a scanner control unit 300 (reading controller), shown in FIG. 3. The scanner section 114 reads a sheet of a document and generates image data. The printer section 115 prints image data generated by the scanner section 114.

FIG. 2 is a side view showing the internal structure of the DF section 200 of the scanner section 114 appearing in FIG. 1. Note that FIG. 2 shows the components inside the DF section 200 in a see-through state for ease of understanding.

The DF section 200 is provided with a document tray 201 for placing a document. The document tray 201 is provided with a document sensor 202, two document guides 203, and a document size detection sensor 204. The document sensor 202 detects whether or not a document is placed on the document tray 201. The two document guides 203 are arranged in a state opposed to each other in a direction orthogonal to a document conveying direction. Each sheet of the document placed on the document tray 201 is conveyed by pickup rollers 205, conveying rollers 207, and discharge rollers 208. The pickup rollers 205 convey the sheets of the document placed on the document tray 201 into a document conveying path (not shown) in the DF section 200. The sheet of the document conveyed by the pickup rollers 205 is detected by a document passage detection sensor 206. In the DF section 200, whether or not a first sheet of the sheet of the document has passed is determined based on a time detected by the document passage detection sensor 206. The conveying rollers 207 convey the sheet of the document conveyed into the document conveying path by the pickup rollers 205 toward the discharge rollers 208. The discharge rollers 208 convey the sheet of the document conveyed by the conveying rollers 207 to a discharge tray 209. Note that the pickup rollers 205, the conveying rollers 207, and the discharge rollers 208 are driven by a stepping motor (not shown).

The sheet of the document conveyed into the document conveying path is read by a sensor unit 211 when the sheet of the document passes a transparent DF reading window 210 provided along the document conveying path. The sensor unit 211 includes a CIS 212, and is arranged at a location where the sensor unit 211 can read a sheet of the document conveyed into the document conveying path through the DF reading window 210. The sensor unit 211 can freely move in a sub scanning direction. For example, the sensor unit 211 moves in the same direction as the direction of conveying a sheet of the document to be conveyed from the conveying rollers 207 to the discharge rollers 208. Note that the DF reading window 210 has a certain length in the sub scanning direction. The CIS 212 can move to a desired position within a range of the length of the DF reading window 210 and read a sheet of the document at the position to which the CIS 212 has moved. The CIS 212 is formed by a plurality of photoelectric conversion elements, such as CCD elements. The CIS 212 has the CCD elements arranged in one line. The CIS 212 generates a control signal for controlling a FIFO for accumulating pixel data read by the CCD elements, and so forth.

FIG. 3 is a schematic block diagram of the scanner control unit 300 of the scanner section 114 appearing in FIG. 1.

Referring to FIG. 3, the scanner control unit 300 includes a CPU 301, a ROM 302, a CLK controller 303, a motor controller 304, a CCD controller 306, and a RAM 307.

The scanner control unit 300 controls the operation of rollers 305 of the scanner section 114 by causing the CPU 301 to execute a scanner section control application program (not shown) stored in the ROM 302. The scanner section control application program is a program for starting a scanner section control application (not shown) for controlling the scanner control unit 300. Note that in the present embodiment, a description will be given of a case where the CPU 301 executes the scanner section control application program, but the device that executes the scanner section control application program is not limited to the CPU 301. For example, the CPU 102 of the controller 101 may control the operation of the scanner section 114 by executing the scanner section control application program.

The CLK controller 303 provides a clock to each of devices forming the scanner control unit 300. The clock includes an image transfer clock, described hereinafter. The CLK controller 303 is formed by a crystal vibration element (not shown) that generates a clock, and a PLL (Phase Locked Loop, not shown). The PLL multiplies or divides the frequency of the clock generated by the crystal vibration element. When a scan execution instruction is received from a user, in the scanner section 114, the CLK controller 303 outputs clocks to the motor controller 304, the CCD controller 306, and the RAM 307, respectively. For example, the motor controller 304 generates a control clock for a motor (not shown) that rotates the rollers 305, based on a clock received from the CLK controller 303. The scan execution instruction includes information on the designation of color/monochrome scanning, a resolution, and so forth, and the scanner section control application changes the settings of the PLL of the CLK controller 303 based on the contents of the scan execution instruction. The CLK controller 303 controls the frequency of the clock to be output based on the settings of the PLL. With this, the reading speed of the scanner section 114 is changed. The RAM 307 accumulates image data of the document read by the CIS 212.

The scanner control unit 300 controls reading of an image, performed by the CIS 212, based on a readout clock 401 appearing in FIG. 4A and a transfer enable clock 402 appearing in FIG. 4B. The readout clock 401 is a clock signal for reading out pixel data forming image data from each CCD element. The transfer enable clock 402 is an image transfer clock. The image transfer clock is a clock signal for controlling whether or not to transfer the read pixel data to the controller 101. The scanner control unit 300 reads out pixel data from each CCD element in synchronism with rising of the readout clock 401. The pixel data read out from each CCD element is accumulated in the RAM 307. Further, the scanner control unit 300 transfers the pixel data accumulated in the RAM 307 to the controller 101 in synchronism with rising of the transfer enable clock 402 controlled based on a horizontal synchronization signal 403 appearing in FIG. 4A. The horizontal synchronization signal 403 is a clock signal for controlling the start of taking in pixel data from one line of the CCD elements.

Further, the scanner control unit 300 generates a PWM signal for driving the pickup rollers 205 provided in the scanner section 114, in synchronism with the horizontal synchronization signal 403. In the MFP 100, in a case where high-speed reading is performed, the period of the horizontal synchronization signal 403 is reduced. This relatively increases the rotational speed of the pickup rollers 205, the document sheet-conveying speed, and the reading speed per sheet of the document. Further, to read out pixel data from the CCD elements in a short time in accordance with the document sheet reading speed, the scanner control unit 300 increases the frequency of the readout clock 401. The scanner control unit 300 accumulates pixel data in the RAM 307 according to the period of the readout clock 401. Further, the scanner control unit 300 increases the frequency of the transfer enable clock 402 in accordance with the control of the frequency of the readout clock 401 and transfers the pixel data from the RAM 307 to the controller 101 in a short time.

FIG. 5 is a sequence diagram of an image reading operation executed by the MFP 100 shown in FIG. 1. The reading operation in FIG. 5 is executed by the above-mentioned scanner section control application for controlling the scanner section 114 and a job control application (not shown) for controlling the controller 101.

Referring to FIG. 5, when a reading start request is received from the controller 101 (step S501), the scanner section 114 reads an N-th page of the document based on the readout clock 401 (step S502). The N-th page of image data formed by a plurality of pixel data items read by the CCD elements is stored in the RAM 307. When reading of the N-th page of the document is completed, the scanner section 114 reads the next page (N+1-th page) of the document (step S503).

Figure 6:
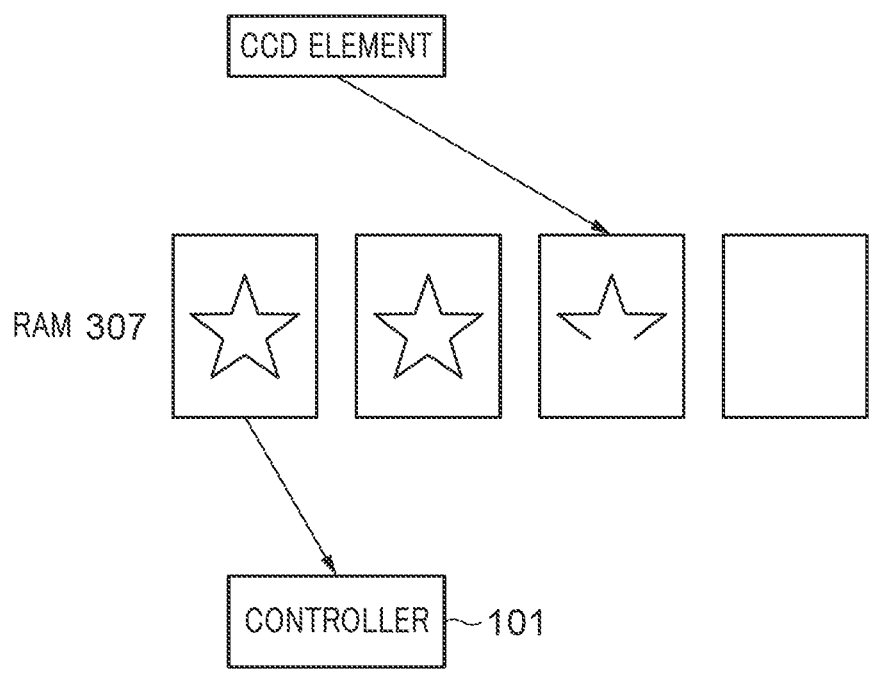
FIG. 6 is a diagram useful in explaining transfer of image data from a RAM to a controller, both appearing in FIG. 3.

On the other hand, when a request for transferring the N-th page of image data is received from the controller 101 (step S504), the scanner section 114 transfers the N-th page of image data to the controller 101 based on the transfer enable clock 402 (step S505). The image data which has been transferred to the controller 101 is deleted from the RAM 307. Note that transfer of image data is controlled such that the image data stored in the RAM 307 is transferred to the controller 101 before using up the storage area of the RAM 307, as shown in FIG. 6.

Figure 7:
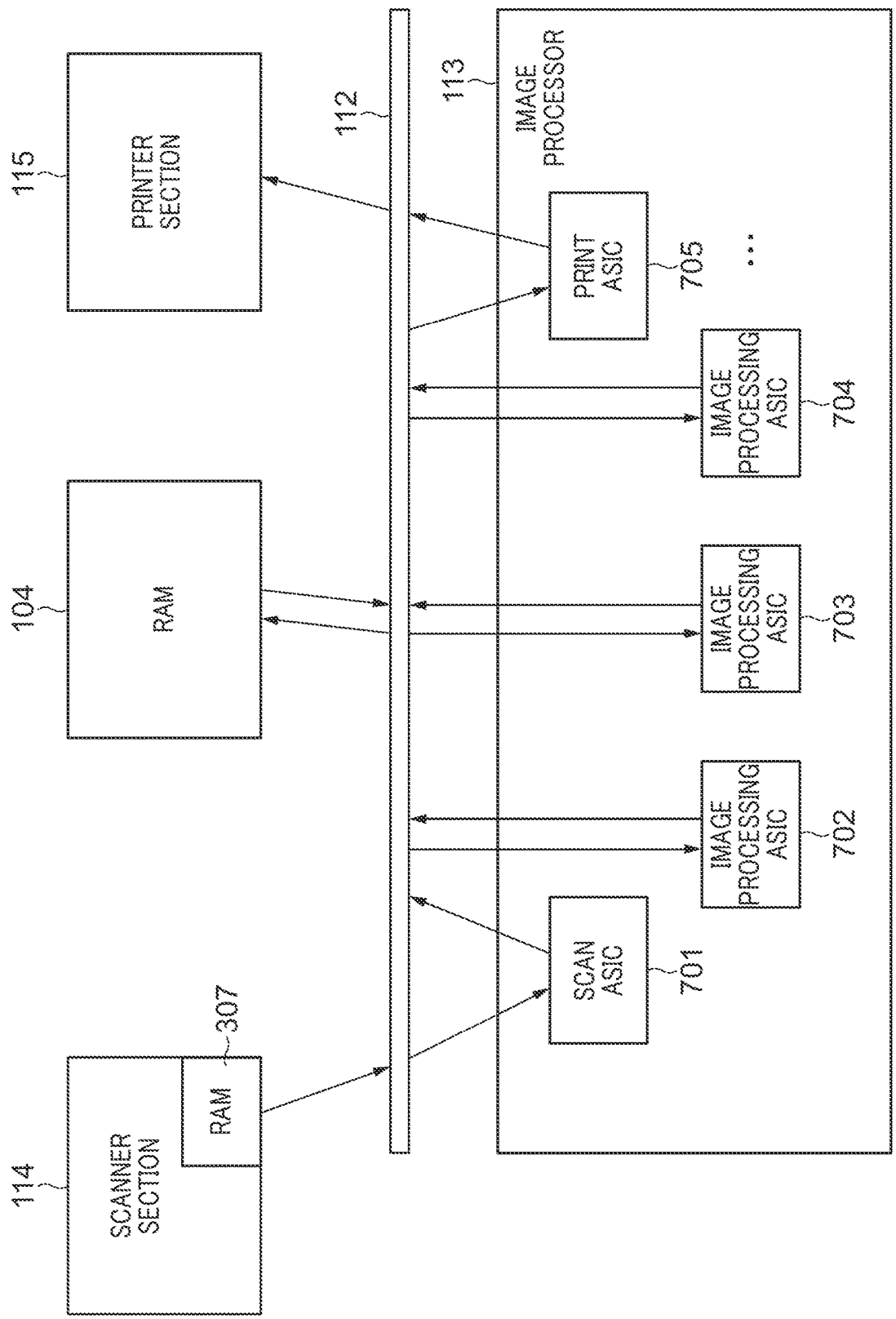
FIG. 7 is a block diagram useful in explaining the configuration of an image processor appearing in FIG. 1.

FIG. 7 is a block diagram useful in explaining the configuration of the image processor 113 appearing in FIG. 1. Referring to FIG. 7, the image processor 113 is provided with a plurality of ASICs 701 to 705 that perform image processings, such as resolution conversion, compression/decompression, image synthesis, binary-multivalue conversion, multivalue-binary conversion, image format conversion, and rendering, on image data. The ASICs 701 to 705 share the RAM 104, and input and output data via the image bus 112. Note that in the present embodiment, at least one of the above-mentioned image processings is executed for each of a scan image processing, a print image processing, a RIP (Raster Image Processing) processing, and an imaging image processing. For example, for the scan image processing, resolution conversion, compression, and image format conversion are performed on image data, whereby the image data is converted to image data of a desired size and a desired file format. For the print image processing, conversion for executing a print process, more specifically, image decompression and image synthesis are performed on image data. For the RIP processing, rendering and image format conversion are performed using image data, whereby image data to be printed is generated. For the imaging image processing, image decompression, binary-multivalue conversion, image format conversion, and image compression are performed on image data, whereby not only image data to be printed, but also image data suitable for attachment to an E-mail or FTP transmission is generated.

The image processor 113 is capable of executing a plurality of image processings in parallel using the ASICs 701 to 705. For example, the scan image processing performed by the ASIC 701 is executed in parallel with the print image processing performed by the ASIC 702. At this time, data transfer is performed via the image bus 112 in each image processing, so that the image bus 112 is congested. Here, for example, in a case where the scanner section 114 performs high-speed reading in the scan image processing, the amount of data to be transferred via the image bus 112 per unit time becomes huge and exceeds the upper limit value of the transferable data amount of the image bus 112. If the amount of data to be transferred via the image bus 112 exceeds the upper limit value of the transferable data amount, data transfer via the image bus 112 cannot be performed, and execution of each image processing is stopped. To overcome this problem, it is being considered that in a case where the scan image processing is executed in parallel with another image processing, the transfer rate at which the scanner section 114 transfers image data via the image bus 112 in the scan image processing is switched to a transfer rate lower than a predetermined transfer rate. With this, when the scan image processing is executed in parallel with the other image processing, the amount of data to be transferred via the image bus 112 per unit time is controlled so as not to exceed the upper limit value of the transferable data amount. However, in the above-described control method, even if the scan image processing and the other image processing have such contents to be processed that even when these processings are executed in parallel, the amount of data to be transferred via the image bus per unit time do not exceed the upper limit value of the transferable data amount, the transfer rate is switched as described above. As a result, the execution time of the scan image processing is unnecessarily increased. In other words, it has conventionally been impossible to execute another image processing in parallel with the scan image processing without unnecessarily increasing the execution time of the scan image processing.

In contrast, in the present embodiment, in a case where the scan image processing and another image processing are not executed in parallel, the transfer rate of image data is set to a first transfer rate, referred to hereinafter. In a case where the scan image processing and another image processing are executed in parallel, one transfer rate is selected from a plurality of different transfer rates which are lower than the first transfer rate, based on scan reading settings of the scan image processing, described hereinafter, and image processing settings of the other image processing, described hereinafter. The selected transfer rate is set as the transfer rate of image data.

Figure 8:
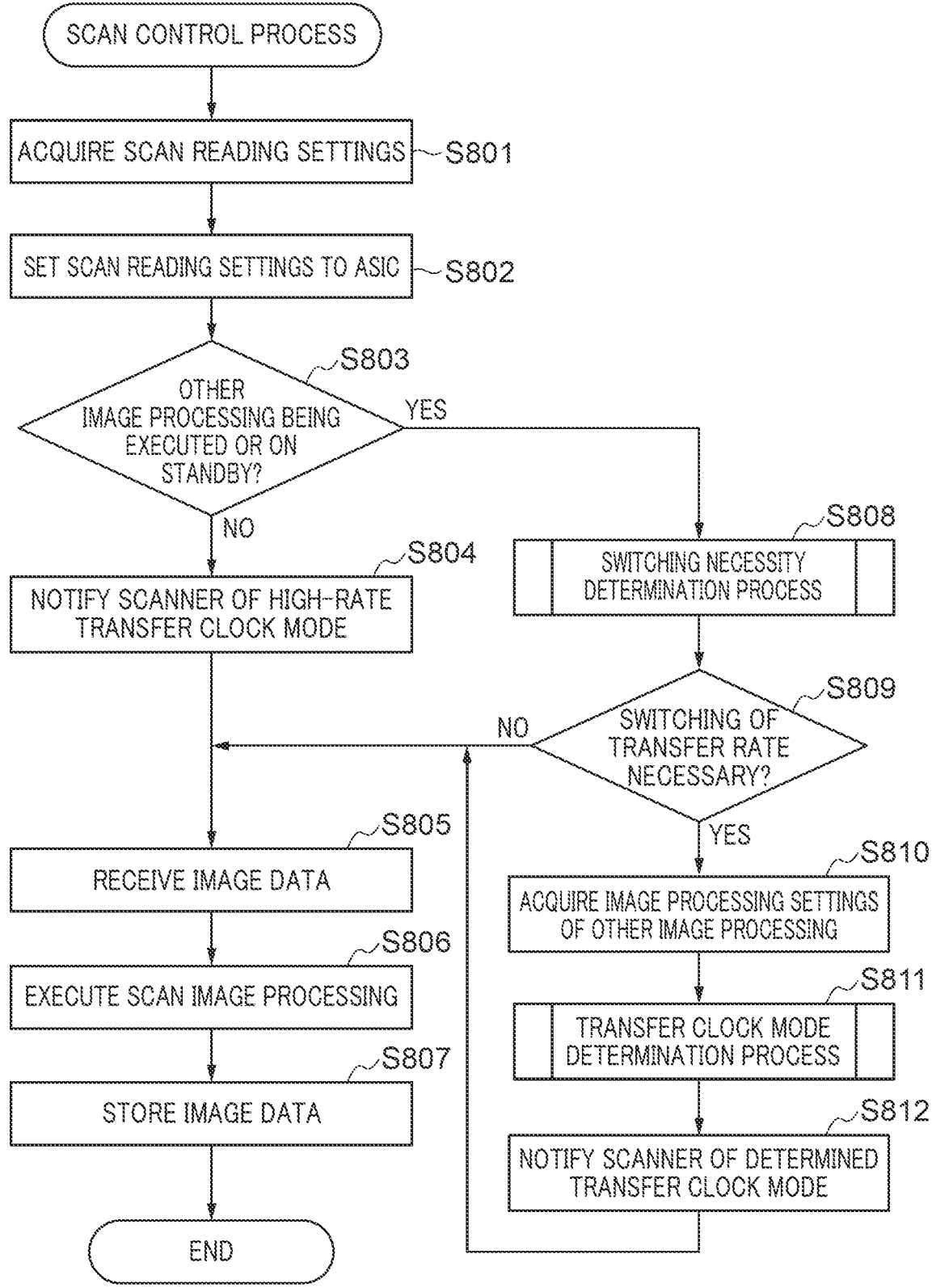
FIG. 8 is a flowchart of a scan control process performed by the MFP shown in FIG. 1.

FIG. 8 is a flowchart of a scan control process performed by the MFP 100 shown in FIG. 1. The scan control process is performed by the CPU 102 that executes a program stored e.g. in the ROM 103. The scan control process is performed when the CPU 102 receives an instruction for reading a sheet of the document using the scanner section 114. Note that in a case where a plurality of pages of the document are placed on the DF section 200, the scan control process is performed on a page-by-page basis. In the scan control process, one of a plurality of transfer clock modes which are different in transfer rate of image data is set. In the present embodiment, a description will be given of a configuration in which one of a high-rate transfer clock mode, a medium-rate transfer clock mode, and a low-rate transfer clock mode is set by way of example. In the high-rate transfer clock mode, the first transfer rate can be realized. In the medium-rate transfer clock mode, a second transfer rate lower than the first transfer rate can be realized. In the low-rate transfer clock mode, a third transfer rate lower than the first transfer rate and the second transfer rate can be realized.

Referring to FIG. 8, the CPU 102 acquires the scan reading settings set via the console section 109 (step S801). The scan reading settings are settings associated with reading of an image of a sheet of the document, and includes e.g. a scan reading color setting, a scan reading sheet side setting, and a scan resolution setting. The scan reading color setting includes a value indicating which of color and monochrome the scan reading color is. The scan reading sheet side setting includes a value indicating which of a single side and both sides is/are to be read. The scan resolution setting includes a value indicating a reading resolution of 300×300 dpi or the like. Then, the CPU 102 determines an ASIC for executing the scan image processing according to the acquired scan reading settings, out of the ASICs 701 to 705 of the image processor 113, and sets the scan reading settings to the determined ASIC (step S802). Then, the CPU 102 determines whether or not another image processing is being executed by an ASIC other than the determined ASIC or being on standby (step S803). The other image processing is e.g. the print image processing, the imaging image processing, or the RIP processing.

If it is determined in the step S803 that another image processing is neither being executed nor being on standby, the CPU 102 sets the first transfer rate. The CPU 102 instructs the scanner section 114 to operate in the high-rate transfer clock mode in which the set first transfer rate can be realized (step S804). In the high-rate transfer clock mode, the CLK controller 303 sets the frequency of the transfer enable clock 402 to a first frequency. The first frequency is a frequency at which transfer of 150 sheets of image data per minute can be realized. The scanner section 114 transfers image data to the controller 101 in synchronism with the transfer enable clock 402. Then, the CPU 102 receives the image data from the scanner section 114 (step S805) and performs the scan image processing on the received image data using the ASIC to which the scan reading settings have been set (step S806). Then, the CPU 102 stores the image data subjected to the scan image processing in the storage memory 105 (step S807), followed by terminating the present process.

If it is determined in the step S803 that another image processing is being executed or on standby, the CPU 102 executes a switching necessity determination process, described hereinafter with reference to FIG. 9 (step S808). Then, the CPU 102 determines whether or not it is necessary to switch the transfer rate based on a result of the determination in the step S808 (step S809).

If it is determined in the step S809 that it is unnecessary to switch the transfer rate, the CPU 102 proceeds to the step S805. As a result, the CLK controller 303 maintains the transfer rate of image data, which has already been set, without changing the same, and the scanner section 114 transfers the image data to the controller 101 in synchronism with the transfer enable clock 402 of the frequency corresponding to the set transfer rate. The transfer rate which has already been set is a transfer rate set in the scan control process executed immediately before or a default transfer rate set to the scanner section 114.

If it is determined in the step S809 that it is necessary to switch the transfer rate, the CPU 102 acquires the image processing settings of the other image processing being executed or on standby (step S810). Then, the CPU 102 executes a transfer clock mode determination process described hereinafter with reference to FIG. 11 (step S811). In the step S811, one of the second transfer rate and the third transfer rate, lower than the first transfer rate, is selected, and a transfer clock mode in which the selected transfer rate can be realized is determined. The CPU 102 instructs the scanner section 114 to operate in the transfer clock mode determined to be used (step S812). For example, in a case where the CPU 102 instructs, in the step S812, the scanner section 114 to operate in the medium-rate transfer clock mode in which the second transfer rate can be realized, the CLK controller 303 sets the frequency of the transfer enable clock 402 to a second frequency. The second frequency is a frequency lower than the first frequency, at which transfer of 100 sheets of image data per minute can be realized. On the other hand, in a case where the CPU 102 instructs the scanner section 114 to operate in the low-rate transfer clock mode in which the third transfer rate can be realized, the CLK controller 303 sets the frequency of the transfer enable clock 402 to a third frequency. The third frequency is a frequency lower than the first and second frequencies, at which transfer of 50 sheets of image data per minute can be realized. Then, the CPU 102 executes the step S805 et seq., followed by terminating the present process.

Figure 9:
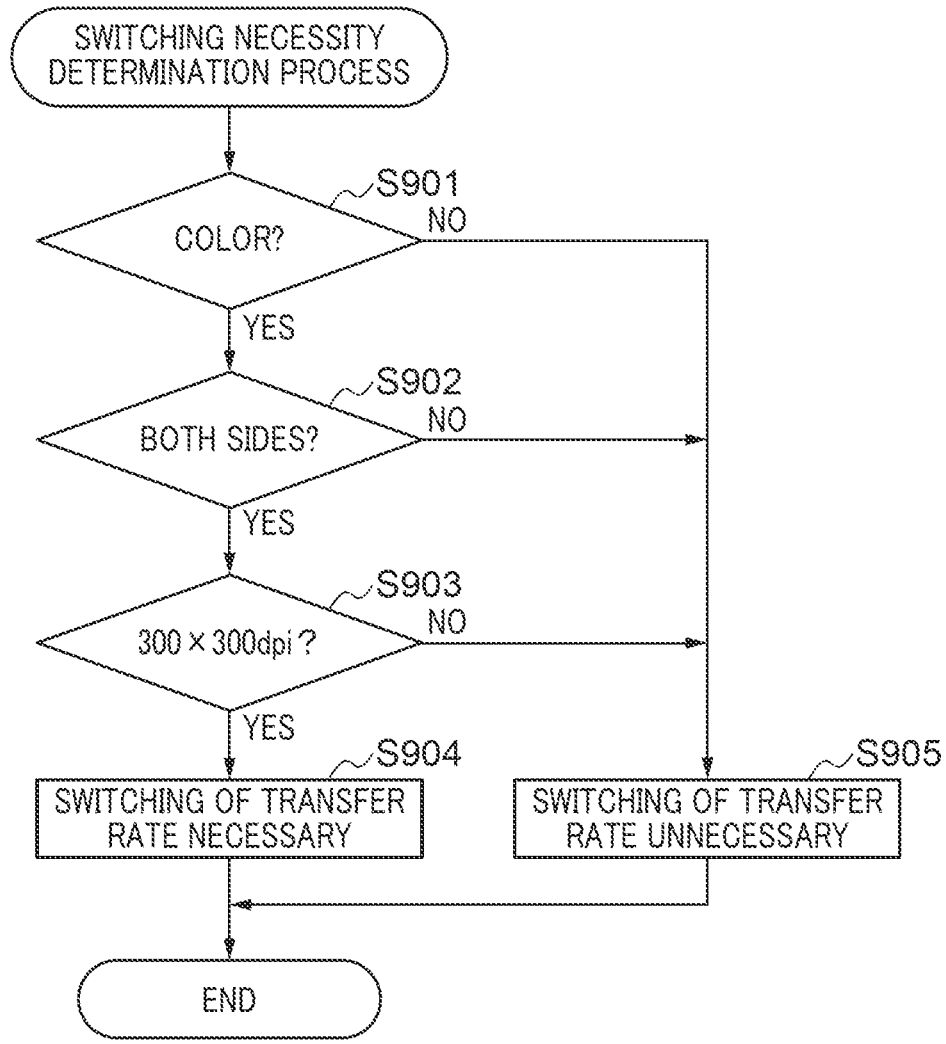
FIG. 9 is a flowchart of a switching necessity determination process in a step in FIG. 8.

FIG. 9 is a flowchart of the switching necessity determination process in the step S808 in FIG. 8.

Referring to FIG. 9, the CPU 102 determines whether or not the scan reading color is set to color based on the scan reading settings acquired in the step S801 (step S901).

If it is determined in the step S901 that the scan reading color is set to color, the CPU 102 determines whether or not the scan reading sheet side is set to both sides (step S902).

If it is determined in the step S902 that the scan reading sheet side is set to both sides, the CPU 102 determines whether or not the scan resolution is set to 300×300 dpi (step S903).

If it is determined in the step S903 that the scan resolution is set to 300×300 dpi, the CPU 102 determines, based on a table, shown in FIG. 10, which lists conditions for determining whether or not it is necessary to switch the clock, that it is necessary to switch the transfer rate (step S904). Here, in a case where the scan reading settings are predetermined settings, image data of high-definition and color, which is relatively large in data amount, is to be transferred via the image bus 112 for both sides of the sheet at a high rate. More specifically, the predetermined settings include a scan reading color setting of color, a scan reading sheet side setting of both sides, and a scan resolution setting of 300×300 dpi. If the scan image processing having these settings is executed in parallel with another image processing, there is a fear that the amount of data to be transferred via the image bus 112 per unit time may exceed the upper limit value of the transferable data amount. To cope with this problem, in the present embodiment, in a case where the scan reading settings of the scan image processing executed in parallel with another image processing are set to the above-mentioned predetermined settings, the transfer rate is controlled such that the amount of data to be transferred via the image bus 112 per unit time does not exceed the upper limit value of the transferable data amount. Then, the CPU 102 terminates the present process. Note that in FIG. 10, CL represents color and BW represents monochrome.

If it is determined in the step S901 that the scan reading color is not set to color, the CPU 102 determines, based on the table shown in FIG. 10, that it is unnecessary to switch the transfer rate (step S905). Alternatively, if it is determined in the step S902 that the scan reading sheet side is not set to both sides, the CPU 102 determines, based on the table shown in FIG. 10, that it is unnecessary to switch the transfer rate (step S905). Alternatively, if it is determined in the step S903 that the scan resolution is not set to 300×300 dpi, the CPU 102 determines, based on the table shown in FIG. 10, that it is unnecessary to switch the transfer rate (step S905). Then, the CPU 102 terminates the present process.

Next, the transfer clock mode determination process in the step S811 in FIG. 8 will be described. Note that in the present embodiment, the transfer clock mode determination process to be executed is different depending on a type of another image processing being executed or on standby, which is one of the print image processing, the RIP processing, and the imaging image processing. The CPU 102 identifies, based on the image processing settings acquired in the step S810 or the like, a type of another image processing being executed or on standby out of the print image processing, the RIP processing, and the imaging image processing. The CPU 102 executes the transfer clock mode determination process corresponding to the identified image processing type.

Figure 11:
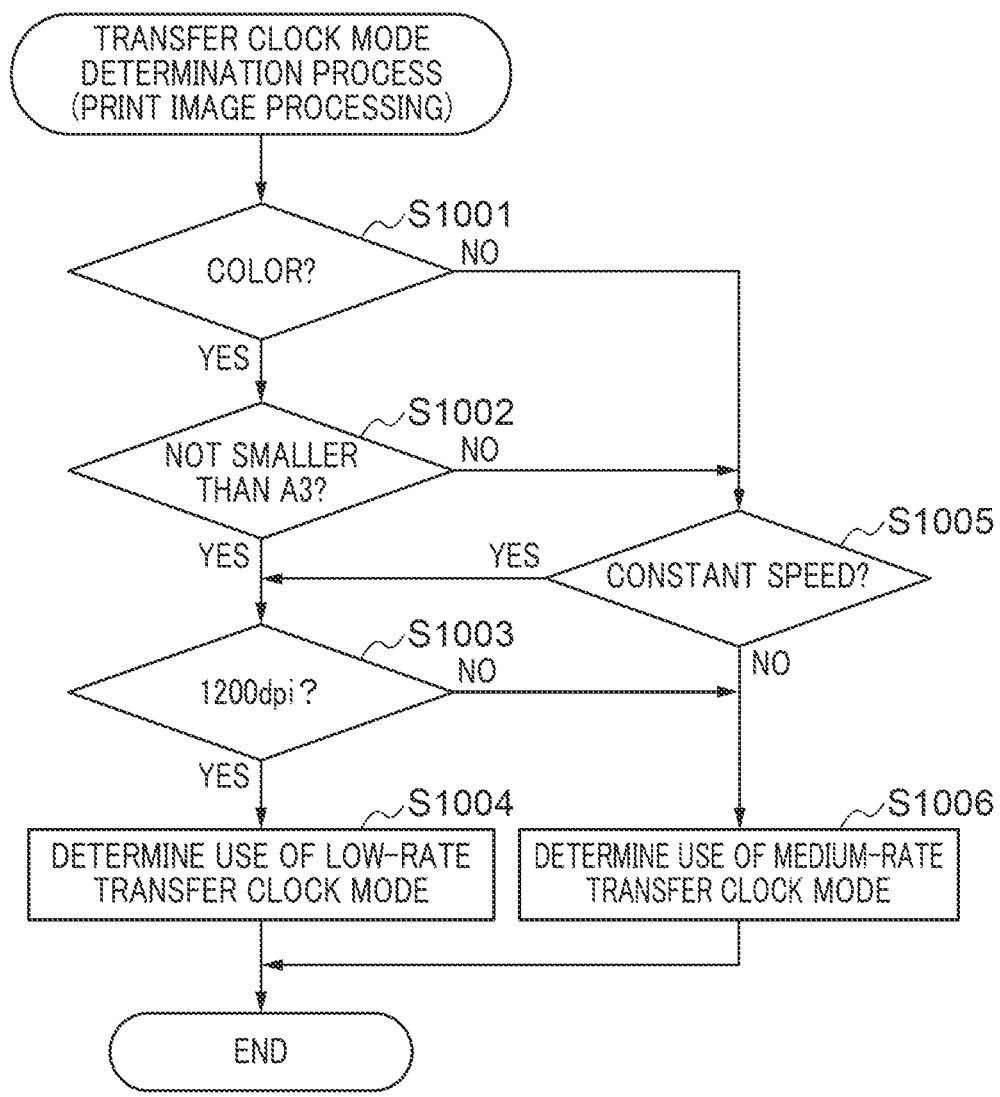
FIG. 11 is a flowchart of a transfer clock mode determination process performed in a case where another image processing being executed or on standby is the print image processing.

FIG. 11 is a flowchart of the transfer clock mode determination process performed in the step S811 in FIG. 8 in a case where the other image processing being executed or on standby is the print image processing. In the process in FIG. 11, it is assumed that the CPU 102 has acquired the settings associated with printing of the document, e.g. a print color setting, a print size setting, a print speed setting, and a print resolution setting, as the image processing settings in the step S810. The print color setting includes a value indicating color or monochrome. The print size setting includes a value indicating a print sheet size of e.g. A3. The print speed setting includes one of values indicating respective print speeds, i.e. "constant speed" at which printing is performed at a predetermined speed and "half speed" at which printing is performed at a speed lower than the predetermined speed. The print resolution setting includes one of values indicating print resolutions of 600 dpi and 1200 dpi.

Referring to FIG. 11, the CPU 102 determines whether or not the print color is set to color (step S1001).

If it is determined in the step S1001 that the print color is set to color, the CPU 102 determines whether or not the print size is set to not smaller than A3 (step S1002).

If it is determined in the step S1002 that the print size is set to not smaller than A3, the CPU 102 determines whether or not the print resolution is set to 1200 dpi (step S1003).

If it is determined in the step S1003 that the print resolution is set to 1200 dpi, the CPU 102 selects the third transfer rate out of the second transfer rate and the third transfer rate, which are lower than the first transfer rate. Accordingly, the CPU 102 determines use of the low-rate transfer clock mode in which the selected third transfer rate can be realized (step S1004), followed by terminating the present process. If it is determined in the step S1003 that the print resolution is not set to 1200 dpi, the CPU 102 proceeds to a step S1006.

If it is determined in the step S1001 that the print color is not set to color, or if it is determined in the step S1002 that the print size is set to smaller than A3, the CPU 102 determines whether not the print speed is set to the constant speed (step S1005).

If it is determined in the step S1005 that the print speed is set to the constant speed, the CPU 102 proceeds to the step S1003.

If it is determined in the step S1005 that the print speed is not set to the constant speed, the CPU 102 selects the second transfer rate out of the second transfer rate and the third transfer rate, which are lower than the first transfer rate. Accordingly, the CPU 102 determines use of the medium-rate transfer clock mode in which the selected second transfer rate can be realized (step S1006). Thus, in the present embodiment, one transfer rate is determined out of the plurality of different transfer rates which are lower than the first transfer rate, based on the scan reading settings and the settings associated with the print image processing. Then, the CP 102 terminates the present process.

FIG. 12 is a table listing transfer clock modes corresponding to the settings associated with the print image processing. Here, in a case where the settings associated with the print image processing are other predetermined settings, image data of high-definition, which is relatively large in data amount, is to be transferred via the image bus 112 at a high rate. More specifically, one set of the other predetermined settings is a combination of a print color setting of color, a print size setting of not smaller than A3, and a print resolution setting of 1200 dpi. Further, another set of the other predetermined settings is a combination of the print color setting of color, a print size setting of smaller than A3, a print speed setting of the constant speed, and the print resolution setting of 1200 dpi. Furthermore, another set of the other predetermined settings is a combination of a print color setting of monochrome, the print speed setting of the constant speed, and the print resolution setting of 1200 dpi. If the print image processing having any of these sets of settings is executed in parallel with the scan image processing, there is a fear that the amount of data to be transferred via the image bus 112 per unit time exceeds the upper limit value of the transferable data amount. For this reason, in the present embodiment, the settings associated with the print image processing executed in parallel with the scan image processing are the other predetermined settings, there is used the low-rate transfer clock mode in which the third transfer rate lower than the first transfer rate and the second transfer rate can be realized. Note that in FIG. 12 as well, CL represents color and BW represents monochrome.

On the other hand, in a case where the settings associated with the print image processing are not the other predetermined settings, the amount of data to be transferred via the image bus 112 does not become so large as in the case where they are the other predetermined settings. In a case where the print image processing having settings which are not the other predetermined settings is executed in parallel with the scan image processing, even when the scanner section 114 is operated not at the third transfer rate, the amount of data to be transferred via the image bus 112 per unit time does not exceed the upper limit value of the transferable data amount. For this reason, in the present embodiment, in the case where the settings associated with the print image processing executed in parallel with the scan image processing are not the other predetermined settings, there is used the medium-rate transfer clock mode in which the second transfer rate higher than the third transfer rate can be realized.

Figure 13:
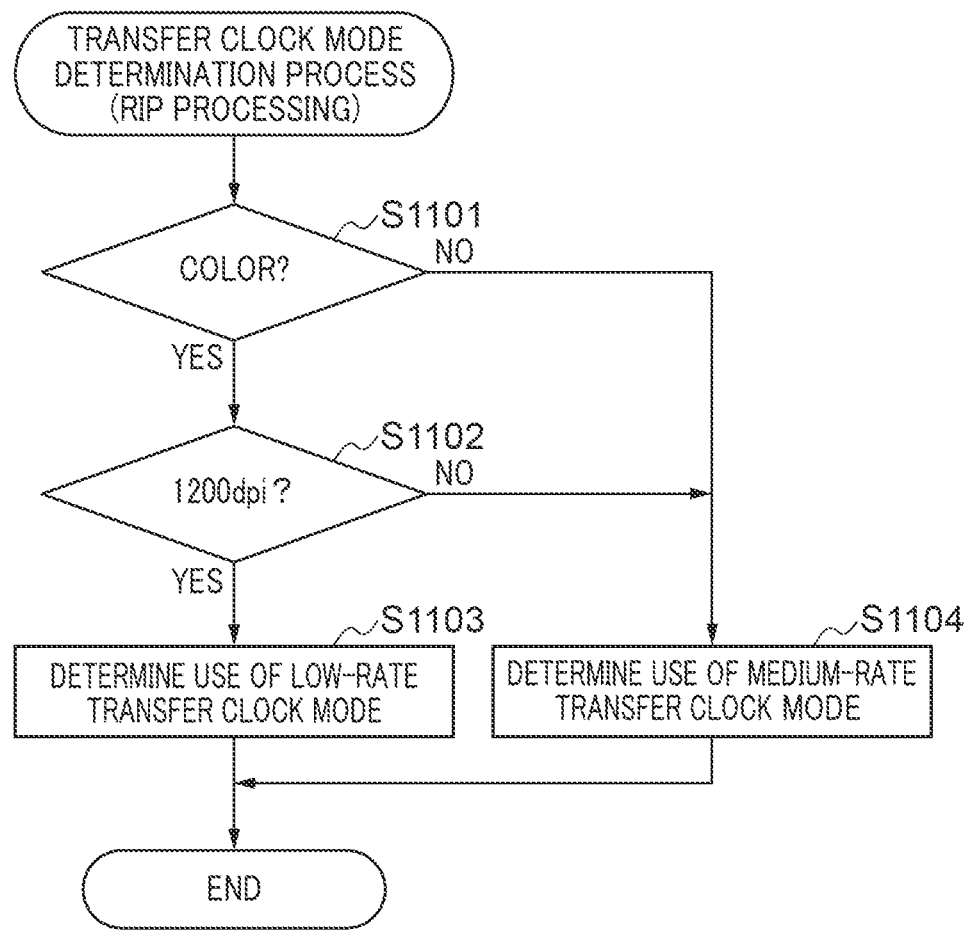
FIG. 13 is a flowchart of a transfer clock mode determination process performed in a case where another image processing being executed or on standby is a RIP processing.

FIG. 13 is a flowchart of the transfer clock mode determination process performed in the step S811 in FIG. 8 in a case where the other image processing being executed or on standby is the RIP processing. In the process in FIG. 13, it is assumed that the CPU 102 has acquired, as the image processing settings, the settings associated with the RIP processing, e.g. a processing color setting and a RIP resolution setting, in the step S810. The processing color setting includes a value indicating which of color and monochrome the processing color in the RIP processing is. The RIP resolution setting includes one of values indicating respective print resolutions of 600 dpi and 1200 dpi.

Referring to FIG. 13, the CPU 102 determines whether or not the processing color is set to color (step S1101).

If it is determined in the step S1101 that the processing color is set to color, the CPU 102 determines whether or not the RIP resolution is set to 1200 dpi (step S1102).

If it is determined in the step S1102 that the RIP resolution is set to 1200 dpi, the CPU 102 selects the third transfer rate out of the second transfer rate and the third transfer rate which are lower than the first transfer rate. Accordingly, the CPU 102 determines use of the low-rate transfer clock mode in which the selected third transfer rate can be realized (step S1103), followed by terminating the present process.

If it is determined in the step S1101 that the processing color is not set to color, or if it is determined in the step S1102 that the RIP resolution is not set to 1200 dpi, the CPU 102 selects the second transfer rate out of the second transfer rate and the third transfer rate. Accordingly, the CPU 102 determines use of the medium-rate transfer clock mode in which the selected second transfer rate can be realized (step S1104), followed by terminating the present process.

FIG. 14 is a table listing the transfer clock modes corresponding to the settings associated with the RIP processing. Here, in a case where the settings associated with the RIP processing are other predetermined settings, image data of high-definition, which is relatively large in data amount, is to be transferred via the image bus 112 at a high rate. More specifically, one set of the other predetermined settings is a combination of a processing color setting of color and a RIP resolution setting of 1200 dpi. If the RIP processing having any of these sets of settings is executed in parallel with the scan image processing, there is a fear that the amount of data to be transferred via the image bus 112 per unit time exceeds the upper limit value of the transferable data amount. For this reason, in the present embodiment, in a case where the settings associated with the RIP processing executed in parallel with the scan image processing are the other predetermined settings, there is used the low-rate transfer clock mode in which the third transfer rate lower than the first transfer rate and the second transfer rate can be realized.

On the other hand, in a case where the settings associated with the RIP processing are not the other predetermined settings, the amount of data to be transferred via the image bus 112 does not become so large as in the case where the associated settings are the other predetermined settings. In a case where the RIP processing having settings which are not the other predetermined settings is executed in parallel with the scan image processing, even when the scanner section 114 is operated not at the third transfer rate, the amount of data to be transferred via the image bus 112 per unit time does not exceed the upper limit value of the transferable data amount. For this reason, in the present embodiment, in the case where the settings associated with the RIP processing executed in parallel with the scan image processing are not the other predetermined settings, there is used the medium-rate transfer clock mode in which the second transfer rate lower than the third transfer rate can be realized.

Figure 15:
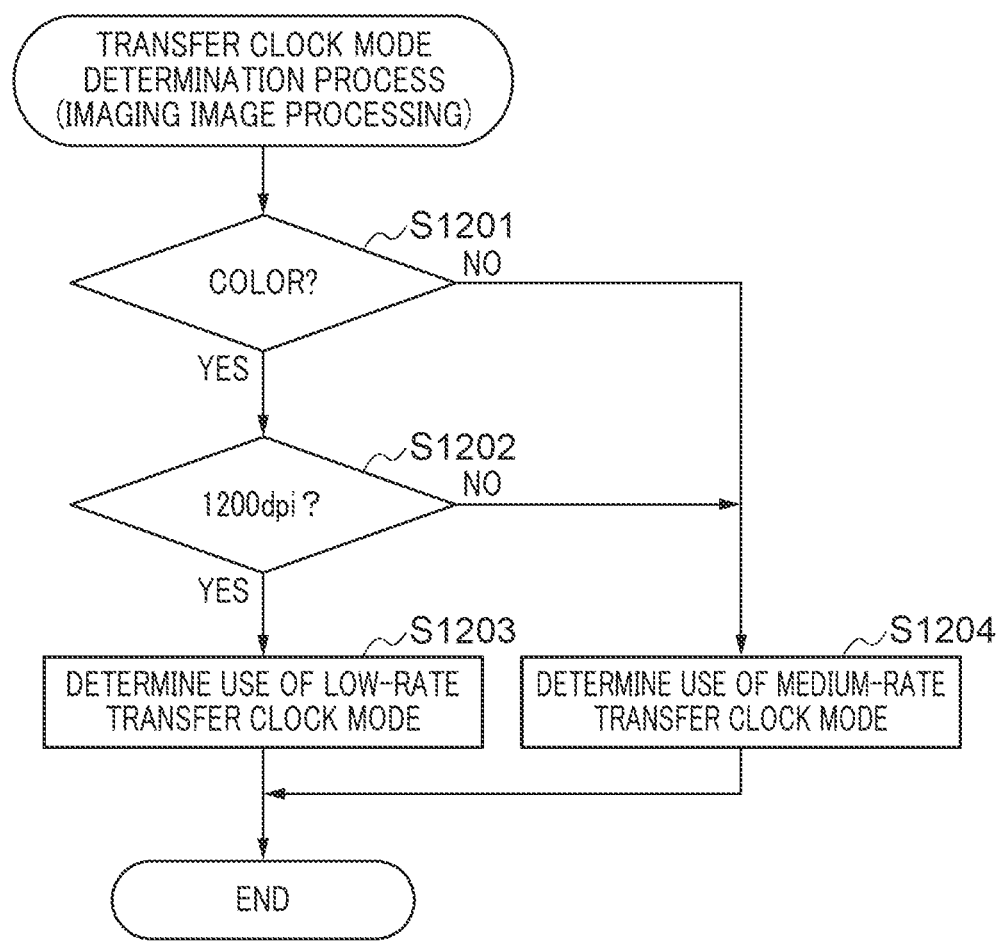
FIG. 15 is a flowchart of a transfer clock mode determination process performed in a case where another image processing being executed or on standby is an imaging image processing.

FIG. 15 is a flowchart of the transfer clock mode determination process performed in the step S811 in FIG. 8 in a case where the other image processing being executed or on standby is the imaging image processing. In the process in FIG. 15, it is assumed that the CPU 102 has acquired the settings associated with the imaging image processing, e.g. a processing color setting and a processing resolution setting, as the image processing settings in the step S810. The processing color setting includes a value indicating which of color and monochrome the processing color in the imaging image processing is. The processing resolution setting includes one of values indicating respective print resolutions of 600 dpi and 1200 dpi.

Referring to FIG. 15, the CPU 102 determines whether or not the processing color is set to color (step S1201).

If it is determined in the step S1201 that the processing color is set to color, the CPU 102 determines whether or not the processing resolution is set to 1200 dpi (step S1202).

If it is determined in the step S1202 that the processing resolution is set to 1200 dpi, the CPU 102 selects the third transfer rate out of the second transfer rate and the third transfer rate, which are lower than the first transfer rate. Accordingly, the CPU 102 determines use of the low-rate transfer clock mode in which the selected third transfer rate can be realized (step S1203), followed by terminating the present process.

If it is determined in the step S1201 that the processing color is not set to color, or if it is determined in the step S1202 that the processing resolution is not set to 1200 dpi, the CPU 102 selects the second transfer rate out of the second transfer rate and the third transfer rate. Accordingly, the CPU 102 determines use of the medium-rate transfer clock mode in which the selected second transfer rate can be realized (step S1204), followed by terminating the present process.

FIG. 16 is a table showing the transfer clock modes corresponding to the settings associated with the imaging image processing. Here, in a case where the settings associated with the imaging image processing are other predetermined settings, image data of high-definition, which is relatively large in data amount, is to be transferred via the image bus 112 at a high rate. More specifically, one set of the other predetermined settings is a combination of a processing color setting of color and a processing resolution setting of 1200 dpi. If the imaging image processing having these settings is executed in parallel with the scan image processing, there is a fear that the amount of data to be transferred via the image bus 112 per unit time exceeds the upper limit value of the transferable data amount. For this reason, in the present embodiment, in the case where the settings associated with the imaging image processing executed in parallel with the scan image processing are the other predetermined settings, there is used the low-rate transfer clock mode in which the third transfer rate lower than the first transfer rate and the second transfer rate can be realized.

On the other hand, in a case where the settings associated with the imaging image processing are not the other predetermined settings, the amount of data to be transferred via the image bus 112 does not become so large as in the case where the associated settings are the other predetermined settings. In a case where the imaging image processing having the settings which are not the other predetermined settings is executed in parallel with the scan image processing, even when the scanner section 114 is operated not at the third transfer rate, the amount of data to be transferred via the image bus 112 per unit time does not exceed the upper limit value of the transferable data amount. For this reason, in the present embodiment, in the case where the settings associated with the imaging image processing executed in parallel with the scan image processing are not the other predetermined settings, there is used the medium-rate transfer clock mode in which the second transfer rate lower than the third transfer rate can be realized.

According to the above-described embodiment, in the case where the scan image processing and another image processing are not executed in parallel, the transfer rate of image data is set to the first transfer rate. In the case where the scan image processing and another image processing are executed in parallel, one transfer rate is selected out of the plurality of transfer rates lower than the first transfer rate based on the scan reading settings of the scan image processing and the image processing settings of the other image processing. The selected transfer rate is set to the transfer rate of image data. In other words, the contents to be processed by the scan image processing and the other image processing are reflected on the setting of the transfer rate of image data. This makes it possible to control the transfer rate of image data to a transfer rate which takes the contents to be processed by the scan image processing and the other image processing into account, and thereby execute the other image processing in parallel without unnecessarily increasing the execution time of the scan image processing.

Further, in the above-described embodiment, in the case where the scan image processing and another image processing are executed in parallel, and the scan reading settings are the predetermined settings and the image processing settings are not the other predetermined settings, the transfer rate of image data is set to the second transfer rate lower than the first transfer rate. In the case where the scan image processing and another image processing are executed in parallel, the scan reading settings are the predetermined settings and the image processing settings are the other predetermined settings, the transfer rate of image data is set to the third transfer rate lower than the first transfer rate and the second transfer rate. With this, it is possible to positively reflect the contents to be processed by the scan image processing and the other image processing on the setting of the transfer rate of image data.

In the above-described embodiment, the scan reading settings of the scan image processing are settings associated with reading of an image of a sheet of the document. This makes it possible to reflect the contents to be processed in association with reading of an image of a sheet of the document in the scan image processing on the setting of the transfer rate of image data.

Further, in the above-described embodiment, the scan reading settings of the scan image processing include a reading color setting, a reading side setting, and a scan resolution setting. This makes it possible to determine whether or not the scan reading settings of the scan image processing executed in parallel with another image processing, which are necessary for the transfer rate control, are settings causing a fear that the amount of data to be transferred via the image bus 112 per unit time exceeds the upper limit value of the transferable data amount.

In the above-described embodiment, the image processing settings of another image processing are settings associated with printing of a sheet of the document. This makes it possible to reflect the contents to be processed in association with printing of a sheet of the document on the setting of the transfer rate of image data.

Further, in the above-described embodiment, the settings associated with printing of a sheet of the document include a print color setting, a print size setting, a print speed setting, and a print resolution setting. This makes it possible to determine whether or not the image processing settings of the print image processing executed in parallel with the scan image processing, which are necessary for the transfer rate control, are settings causing a fear that the amount of data to be transferred via the image bus 112 per unit time exceeds the upper limit value of the transferable data amount.

In the above-described embodiment, the image processing settings of another image processing are settings associated with the RIP processing. This makes it possible to reflect the contents to be processed in association with the RIP processing on the setting of the transfer rate of image data.

Further, in the above-described embodiment, the settings associated with the RIP processing include a processing color setting and a RIP resolution setting. This makes it possible to determine whether or not the image processing settings of the RIP processing executed in parallel with the scan image processing, which are necessary for the transfer rate control, are settings causing a fear that the amount of data to be transferred via the image bus 112 per unit time exceeds the upper limit value of the transferable data amount.

In the above-described embodiment, the image processing settings of another image processing are settings associated with the imaging image processing. This makes it possible to reflect the contents to be processed in association with the imaging image processing on the setting of the transfer rate of image data.

Further, in the above-described embodiment, the settings associated with the imaging image processing include a processing color setting and a processing resolution setting. This makes it possible to determine whether or not the image processing settings of the imaging image processing executed in parallel with the scan image processing, which are necessary for the transfer rate control, are settings causing a fear that the amount of data to be transferred via the image bus 112 per unit time exceeds the upper limit value of the transferable data amount.

In the above-described embodiment, the predetermined settings and the other predetermined settings are settings causing the amount of image data to be transferred via the image bus 112 per unit time to exceed the upper limit value of the transferable data amount (predetermined amount)

when the scan image processing and the other image processing are executed in parallel. This makes it possible to control the transfer rate based on whether or not the amount of image data to be transferred via the image bus 112 per unit time exceeds the upper limit value of the transferable data amount when the scan image processing and the other image processing are executed in parallel.

Although the present invention is described based on the embodiment, the present invention is by no means limited to the above-described embodiment. For example, in the step S811, a transfer rate to be set may be selected out of three or more different transfer rates lower than the first transfer rate. Note that the three or more different transfer rates lower than the first transfer rate include the second transfer rate and the third transfer rate. In this configuration, not only the high-rate transfer clock mode, the medium-rate transfer clock mode, and the low-rate transfer clock mode, but also one or a plurality of other transfer clock modes corresponding to the other transfer rate(s) is/are set.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-039054, filed Mar. 6, 2020, which is hereby incorporated by reference herein in its entirety.

What is claimed is:

1. A multifunction peripheral comprising:
a reader that reads an image of a document sheet to generate image data;
a reader controller that controls the reader; and
a controller having an image processor configured to execute image processing on image data,
wherein the reader controller transfers image data to the controller via a data bus,
wherein the controller determines whether or not the image processing and another predetermined image processing are executed in parallel,
wherein the controller determines whether or not settings associated with the image processing are predetermined settings,
wherein the controller determines whether or not settings associated with the other predetermined image processing are other predetermined settings,
wherein the reader controller sets, in a case where it is determined by the controller that the image processing and the other predetermined image processing are not executed in parallel, a transfer rate of image data to be transferred by the reader controller to a first transfer rate, and
wherein, in a case where it is determined by the controller that the image processing and the other predetermined image processing are executed in parallel, the controller selects one transfer rate out of a plurality of different transfer rates lower than the first transfer rate based on a determined result of whether or not the settings associated with the image processing are predetermined settings and a determined result of whether or not settings associated with the other predetermined image processing are other predetermined settings, and the reader controller sets the transfer rate of the image data to the selected transfer rate.

2. The multifunction peripheral according to claim 1, wherein in a case where it is determined by the controller that the image processing and the other predetermined image processing are executed in parallel, and the settings associated with the image processing are the predetermined settings and the settings associated with the other predetermined image processing are not the other predetermined settings, the reader controller sets the transfer rate of the image data to a second transfer rate selected out of the plurality of different transfer rates, and in a case where it is determined by the controller that the image processing and the other predetermined image processing are executed in parallel, and the settings associated with the image processing are the predetermined settings and the settings associated with the other predetermined image processing are the other predetermined settings, the reader controller sets the transfer rate of the image data to a third transfer rate which is selected out of the plurality of different transfer rates and is lower than the second transfer rate.

3. The multifunction peripheral according to claim 1, wherein the settings associated with the image processing are settings associated with reading of the image of the sheet of the document.

4. The multifunction peripheral according to claim 3, wherein the settings associated with the image processing include a reading color setting, a reading side setting, and a scan resolution setting.

5. The multifunction peripheral according to claim 1, wherein the settings associated with the other image processing are settings associated with printing of the image data.

6. The multifunction peripheral according to claim 5, wherein the settings associated with the other image processing include a print color setting, a print size setting, a print speed setting, and a print resolution setting.

7. The multifunction peripheral according to claim 1, wherein the settings associated with the other image processing are settings associated with a RIP processing.

8. The multifunction peripheral according to claim 7, wherein the settings associated with the other image processing include a processing color setting and a RIP resolution setting.

9. The multifunction peripheral according to claim 1, wherein the settings associated with the other image processing are settings associated with an imaging image processing.

10. The multifunction peripheral according to claim 9, wherein the settings associated with the other image processing include a processing color setting and a processing resolution setting.

11. The multifunction peripheral according to claim 1, wherein the predetermined settings and the other predetermined settings are settings causing the amount of image data to be transferred via the data bus to exceed a predetermined amount when the image processing and the other predetermined image processing are executed in parallel.

12. A method of controlling a multifunction peripheral comprising a reader that reads an image of a document sheet to generate image data, a reader controller that controls the reader, and a controller having an image processor configured to execute image processing on image data, the reading controller being configured to transfer image data to the controller via a data bus, the method comprising:
   determining whether or not the image processing and another predetermined image processing are executed in parallel;
   determining whether or not settings associated with the image processing are predetermined settings;
   determining whether or not settings associated with the other predetermined image processing are other predetermined settings; and
   setting, in a case where it is determined that the image processing and the other predetermined image processing are not executed in parallel, a transfer rate of image data to be transferred by the reader controller to a first transfer rate; and
   selecting, in a case where it is determined that the image processing and the other predetermined image processing are executed in parallel, one transfer rate out of a plurality of different transfer rates lower than the first transfer rate based on a determined result of whether or not the settings associated with the image processing are predetermined settings and a determined result of whether or not settings associated with the other predetermined image processing are other predetermined settings, and setting the transfer rate of the image data to be transferred by the reader controller to the selected transfer rate.

13. A non-transitory computer-readable storage medium storing a program for causing a computer to execute a method of controlling a multifunction peripheral comprising a reader that reads an image of a document sheet to generate image data, a reader controller that controls the reader, and a controller having an image processor configured to execute image processing on image data, the reading controller being configured to transfer image data to the controller via a data bus,
   wherein the method comprises:
   determining whether or not the image processing and another predetermined image processing are executed in parallel;
   determining whether or not settings associated with the image processing are predetermined settings;
   determining whether or not settings associated with the other predetermined image processing are other predetermined settings;
   setting, in a case where it is determined that the image processing and the other predetermined image processing are not executed in parallel, a transfer rate of image data to be transferred by the reader controller to a first transfer rate; and
   selecting, in a case where it is determined that the image processing and the other predetermined image processing are executed in parallel, one transfer rate out of a plurality of different transfer rates lower than the first transfer rate based on a determined result of whether or not the settings associated with the image processing are predetermined settings and a determined result of whether or not settings associated with the other predetermined image processing are other predetermined settings, and setting the transfer rate of the image data to be transferred by the reader controller to the selected transfer rate.

* * * * *